(12) United States Patent
Matsuba et al.

(10) Patent No.: US 7,538,944 B2
(45) Date of Patent: May 26, 2009

(54) POLARIZING FILTER, AND METHOD FOR FABRICATING SAME

(75) Inventors: Takahiko Matsuba, Sano (JP); Yoshiji Kawamura, Sano (JP); Homin Ryu, Sano (JP); Hajime Kurahashi, Sano (JP)

(73) Assignee: Fujinon Corporation, Saitama-shi (JP)

( * ) Notice: Subject to any disclaimer, the term of this patent is extended or adjusted under 35 U.S.C. 154(b) by 232 days.

(21) Appl. No.: 11/733,968

(22) Filed: Apr. 11, 2007

(65) Prior Publication Data

US 2008/0018996 A1      Jan. 24, 2008

(30) Foreign Application Priority Data

Apr. 17, 2006   (JP) .............................. 2006-112928

(51) Int. Cl.
*G02B 5/30*   (2006.01)
(52) U.S. Cl. ..................... 359/495; 359/496; 359/497; 156/99
(58) Field of Classification Search ......... 359/495–497, 359/501–502; 353/20; 362/19
See application file for complete search history.

(56) References Cited

U.S. PATENT DOCUMENTS

| | | | | |
|---|---|---|---|---|
| 6,394,607 | B1 * | 5/2002 | Hashizume et al. | 353/31 |
| 6,436,214 | B1 * | 8/2002 | Murata | 156/99 |
| 6,542,298 | B1 * | 4/2003 | Aoki | 359/483 |
| 2003/0214716 | A1 * | 11/2003 | Drazic | 359/487 |
| 2006/0180262 | A1 * | 8/2006 | Fuse et al. | 156/99 |

FOREIGN PATENT DOCUMENTS

JP            05019208 A  *  1/1993

* cited by examiner

*Primary Examiner*—Lee Fineman
(74) *Attorney, Agent, or Firm*—Oblon, Spivak, McClelland, Maier & Neustadt, P.C.

(57) ABSTRACT

A polarizing filter with a gapless polarization separating filter layer formed between a plane of incidence and a plate of transmission of the filter, the polarization separating filter layer being formed by connecting first filter layer sections alternately and crosswise with second inclined filter layer sections in an approximately zigzag shape. The filter is free of the problem of light leakage and can perform the functions of a polarizing filter satisfactorily.

4 Claims, 7 Drawing Sheets

(a)

(b)

(a)

(b)

POLARIZING FILTER, AND METHOD FOR FABRICATING SAME

BACKGROUND OF THE INVENTION

1. Field of the Art

This invention relates to a polarizing filter which is capable of transmitting polarization of a specific direction alone, and a method for fabricating such a filter.

2. Prior Art

Polarizing filters are used in optical devices such as optical pickups and liquid crystal projectors or in image pickups of digital cameras, for the purpose of selectively transmitting either p- or s-polarized component in mixed polarization light. As for example of polarizing filter, Japanese Laid-Open Patent Application H5-19208 discloses a polarizing filter which is formed by bonded in an array a plural number of polarized beam splitters each with a polarization separating filter layer to transmit or reflect polarized components of input light according to the direction of polarization. In just-mentioned Japanese Laid-Open Patent Application H5-19208, in order to impart functions as a polarizing filter (which is called "a polarized beam splitter array" in No. H-19208), a plural number of polarized beam splitters, each formed with a polarization separation coating at an inclination angle of 45 degrees, are arrayed and bonded together in such a way that polarization separating filter layers on two adjacent polarized beam splitters are disposed in perpendicularly intersecting relation with each other.

In the case of the polarizing filter in above-mentioned Japanese Laid-Open Patent Application H5-19208 having a plural number of polarized beam splitters bonded together to make up a polarizing filter, the polarization separating filter layers on adjacent polarized beam splitters can be brought into linear contact only when they are bonded with perfect accuracy, and continuity of polarization separating filter layers can be damaged even by a slight deviation of joining surfaces. If a gap exists in a polarization separating filter layer of a polarizing filter, leakage of incident light takes place at the gap, where part of incident light is simply leaked through without undergoing the separating action of the polarizing filter. That is to say, leaked light still contains p- and s-polarized components in a mixed state, because the polarizing filter is unable to perform its functions to a sufficient degree due to a flaw in the filter layer.

Further, at the time of producing a polarizing filter by bonding together a number of polarizing beam splitters, a step-out portion is formed at a joint portion of two adjacent polarized beam splitters if one polarized beam splitter is deviated relative to the other one in a direction parallel with direction of propagation of incident light. If such a step-out portion is formed, an edge portion (an edge line) of one polarized beam splitter stands out distinctively in such a degree as to invite cracking or chipping damages, which might lead to a loss of part of a polarization separating filter layer on the stepped-out edge portion. In that case, a gap is opened up in the lost portion, and, as mentioned above, unseparated light, i.e., a mixture of p- and s-polarizations, is transmitted directly through the gap. That is to say, the polarizing filter no longer can perform its function satisfactorily.

If such a flawed polarizing filter is applied to a liquid crystal projector, for example, a mixture of p- and s-polarizations is transmitted through the lost part of a polarization separating filter layer to darken or dim out a brightness level of picture images projected on a screen. In a case where a polarizing plate is located at a position posterior to the polarizing filter, a mixture of p- and s-polarizations is absorbed by the polarizing plate. Since a service life of a polarizing plate is dependent on an accumulated light volume, leaks of mixed light causes increases to the light volume absorbed by the polarizing plate which is located posterior to the defective polarizing filter, shortening the service life of the polarizing plate.

On the other hand, in the case of the polarizing filter which is composed of an array of polarized beam splitters, if a stepped-out portion is formed at a joint of adjacent polarized beam splitters as mentioned above, the polarizing filter as a whole is distorted into either concave or convex shape without retaining a planar shape. Such a distorted polarizing filter comes to have lens effects, instead of purely performing its intended function alone, i.e., the function of separating p- and s-polarizations.

Thus, when fabricating a polarizing filter of this sort, perfection in accuracy is required at the time of bonding a number of polarized beam splitters in an array, which however is extremely difficult because polarized beam splitters are very small in size. Especially, as described in Japanese Laid-Open Patent Application H5-19208, for compactification of optical systems as a whole, there are strong demands for polarizing filters which are reduced in size, weight and thickness, despite the problem that it is extremely difficult to bond together small polarized beam splitters, in addition to a problem that a production cost becomes higher when higher accuracy is required in a fabrication process.

SUMMARY OF THE INVENTION

It is an object of the present invention to provide a polarizing filter with a gapless polarization separating filter layer, precluding leakage of incident light which escapes from separating actions of the filter.

According to the present invention, there is provided a polarizing filter of planar transparent substrate plates with a polarization separating filter layer to transmit or reflect incident light according to direction of polarization, the polarizing filter having a plane of incidence and a plane of transmission in the direction of two orthogonal X- and Y-axes and a thickness in the direction of Z-axis orthogonal to the X- and Y-axes, characterized in that the polarizing filter comprises: a polarization separating filter layer composed of a first group of inclined filter layer sections each having a plane in the direction of the Z- and Y-axes inclined in the direction of the X-axis through a predetermined angle, alternately with a second group of inclined filter layer sections each having a plane in the direction of the Z- and Y-axes inclined through the same angle as but in a symmetrically inverse direction relative to the inclined filter layer sections of the first group; the inclined filter layer sections of the first group being connected crosswise with the inclined filter layer sections of the second group in a cross shape or in a T-shape at positions inward of the plane of incidence and the plane of transmission of the polarizing filter; and each one of the inclined filter layer sections of the first and second groups, which is exposed on the plane of incidence and the plane of transmission of the polarizing filter at opposite ends, being connected crosswise with an adjacent inclined filter layer section of the other group in a cross shape or in a T-shape at least at two positions; each one of the inclined filter layer sections of the first and second groups, which is exposed on the plane of incidence or on the plane of transmission of the polarizing filter at one end alone, being connected crosswise with an inclined filter layer section of the other group in a T-shape at the other end; and each one of the inclined filter layer sections of the first and second groups, which is not exposed on the plane of incidence and the plane of transmission of the polarizing filter at any end, being connected crosswise with inclined filter layer sections of the other group in a T-shape at opposite ends.

According to the present invention, there is also provided a method for fabricating a polarizing filter of planar transparent substrate plates with a polarization separating filter layer to transmit or reflect incident light according to direction of polarization, the method comprising the steps of: polishing surfaces at opposite sides of said planar transparent substrate plates; forming a polarization separating filter layer on one of polished surfaces on front and rear sides of each transparent substrate plate; forming a straight stack of the transparent substrate plates by successively stacking and bonding the substrate plates one on another in vertical alignment with each other, joining a filter layer-bearing side of a substrate plate to a blank side of another substrate plate; cutting with a uniform distance the straight stack crosswise of the polarization separating filter layers formed on the substrate plates to produce crosscut blocks; polishing cut surfaces of the crosscut blocks; forming a polarization separating filter layer on one of polished surfaces on front and rear sides of the crosscut blocks; forming a staggered stack of the crosscut blocks by successively stacking and bonding the crosscut blocks in staggered positions in the fashion of a staircase, joining a filter layer-bearing side of a crosscut block with a blank side of another crosscut block; cutting the staggered stack along cutting lines with said staggered inclination angle to produce orthorhombic filter blocks of uniform thickness; and polishing cut surfaces of the orthorhombic filter blocks to produce polarizing filter units; the cutting lines in cutting the staggered stack being spaced apart from each other by a distance T2 satisfying an equation $T2 > T1/\sqrt{2}$ where T1 is thickness of the crosscut blocks.

By adoption of the polarizing filter construction as described above, it becomes possible to prevent leakage of incident light which escapes from separating actions of the filter.

The above and other objects, features and advantages of the present invention will become apparent from the following particular description of the invention, taken in conjunction with the accompanying drawings which show by way of example preferred embodiments of the invention. Needless to say, the present invention is not limited to particular forms exemplified in the drawings.

DESCRIPTION OF PREFERRED EMBODIMENTS

Figure 1:
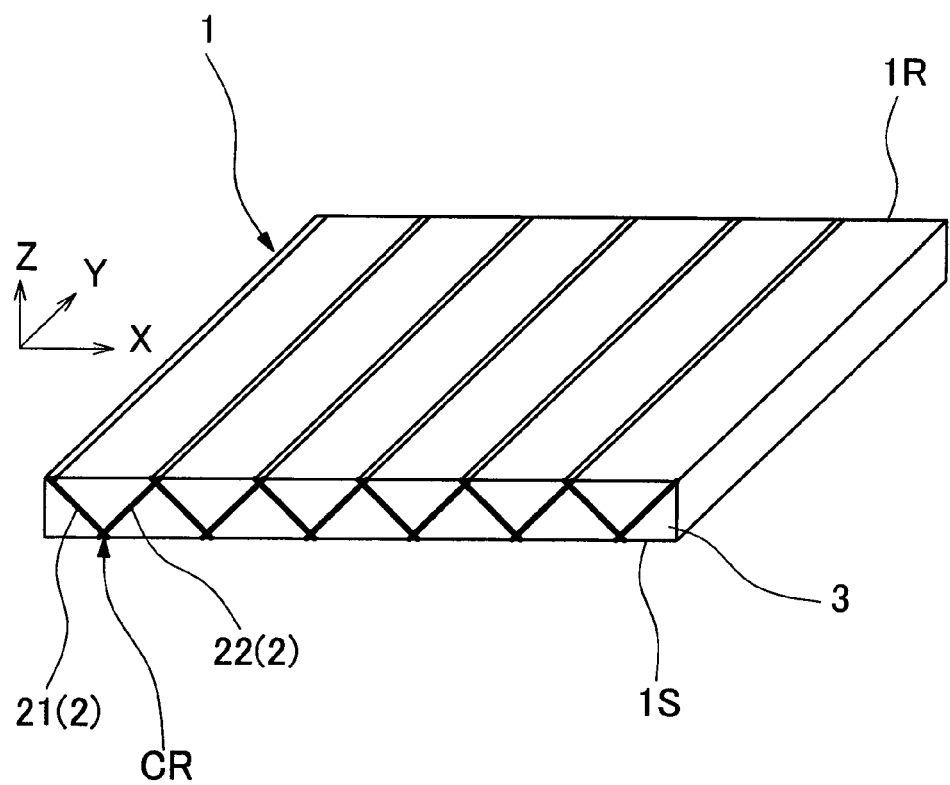
FIG. 1 is a perspective view of a polarizing filter.

Hereafter, the invention is described more particularly by way of its preferred embodiments with reference to the accompanying drawings. In FIG. 1, indicated at 1 is a polarizing filter according to the invention, with a gapless polarization separation filter layer 2 formed continuously and uninterruptedly within a transparent member 3 in the form of a planar glass plate or the like. The polarization separating filter layer 2 is a dielectric multi-layer coating which is formed by alternately laminating a low refractivity layer and a high refractivity layer, and has a function of transmitting or reflecting incident light components according to direction of polarization. In this particular embodiment, the polarizing filter 1 is adapted to transmit p-polarized light and transmit s-polarized light. Of course, the polarizing filter 1 can be imparted with inverse optical properties if necessary. Thus, of a light beam incident on the polarizing filter 1, p-polarized light is transmitted through the filter 1 while s-polarized light is reflected off by the polarization separating filter layer 2.

As shown in FIG. 1, the polarizing filter 1 is formed with a plane of incidence 1S and a plane of transmission 1R at its opposite sides. Incident light rays enter the filter 1 through the plane of incidence 1S and one polarization component alone is transmitted through the plane of transmission 1R. Thus, the plane of transmission 1R is formed on the opposite side from the plane of incidence 1S, and the polarization separating coating 2 is formed in an approximately zigzag shape between the plane of incidence 1S and the plane of transmission 1R of a plane transparent member 3. The polarization separating filter layer 2 functions to transmit p-polarization and reflect off s-polarization when it is disposed at a predetermined angle relative to incident light (e.g., at an angle of 45 degrees). The polarization separating filter layer 2 in an approximately zigzag form contributes to reduce the thickness of the polarizing filter 1 of the ultimate produce and to downsize a whole optical appliance to a compact form. The reason why the polarization separating coating 2 is expressed as being "in an approximately zigzag form" instead of being "in a zigzag form" will be explained hereinafter.

In this instance, in order to let the polarizing filter 1 perform the separating function by transmitting only a p-polarization component of incident light rays in a sufficient degree, it is necessary to input all of the incident light rays to the polarization separating filter layer 2. For this purpose, it is necessary to employ a gapless filter construction in which no gap is opened in the polarization separating filter layer 2. If a gap exists in the polarization separating coating 2, light rays in the form of a mixture of p- and s-polarizations are transmitted through the gap, escaping from the separating function of the polarizing filter. That is to say, in that case, the polarizing filter cannot perform its function to a satisfactory degree.

FIG. 1 shows the construction of the polarizing filter 1 in connection with three orthogonal axes X, Y and Z. In this case, the polarizing filter 1 has the plane of incidence 1S and the plane of transmission 1R in the directions of X- and Y-axes, respectively (having a longer side in the direction of X-axis and a shorter side in the direction of Y-axis in the particular embodiment shown). The polarizing filter 1 has a thickness in the direction of Z-axis. As mentioned hereinbefore, the polarization separating filter layer 2 is formed in an approximately zigzag form. More particularly, the polarization separating coating 2 is composed of a first group of inclined filter layer sections 21 which are formed on a plural number of planar surfaces YZ, defined by Y- and Z-axes, and inclined in the direction of X-axis, and a second group of inclined filter layer sections 22 which are formed on a plural number of planar surfaces which are inclined through the same angle as but in an inverse direction relative to the inclined filter layer sections 21 of the first group. As shown in FIG. 1, the inclined filter layer sections 21 of the first group are alternately connected crosswise with the inclined filter layer sections 22 of the second group at positions inwardly in the proximity of the plane of incidence 1S and the plane of transmission 1R. Thus, the polarization separating coating 2 presents an approximately zigzag shape as a whole.

That is to say, the inclined filter layer sections 21 of the first group are not in line contact with the inclined filter layer sections 22 of the second group, but are connected crosswise with the latter at positions slightly inward of the plane of incidence 1S and the plane of transmission 1R. If adjacent filter layer sections 21 and 22 were connected with each other in line contact, the polarization separating coating 2 would present a strictly zigzag shape as a whole. However, the adjacent filter layer sections 21 and 22 are connected with each other crosswise, the polarization separating filter layer 2 presents an approximately zigzag shape as a whole.

Figure 2:
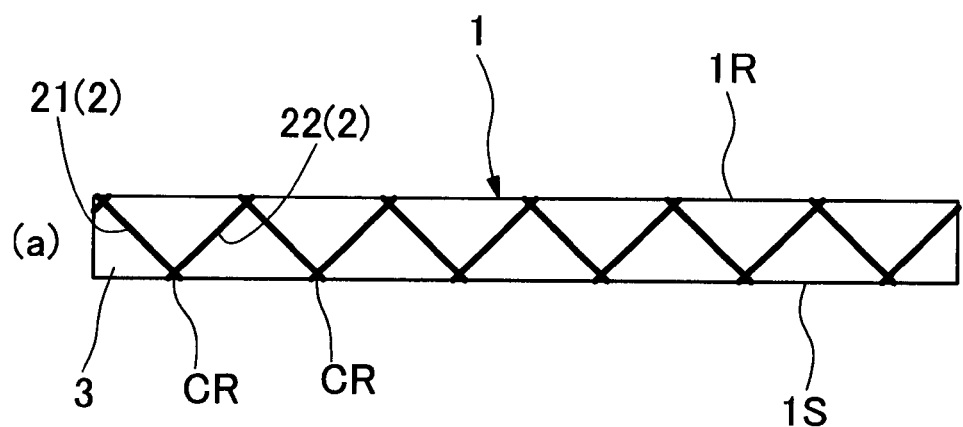
FIGS. 2(a) and 2(b) are a side view of the polarizing filter, and an enlarged fragmentary view explanatory of functions of the filter.
Figure 2:
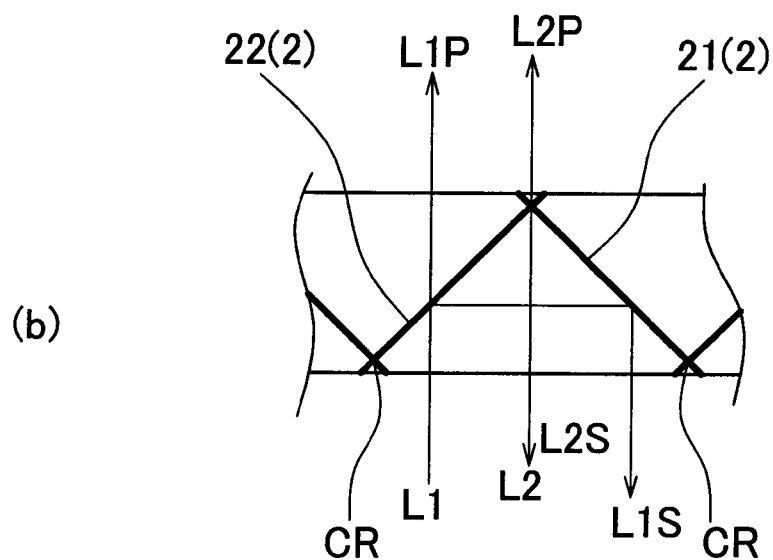

As mentioned above, the inclined filter layer sections 21 and 22 of the first and second groups are connected crosswise at positions inwardly in the vicinity of the plane of incidence 1S and the plane of transmission 1R of the polarizing filter 1. Namely, the inclined filter layer sections 21 and 22 are crossed with each other within the polarizing filter 1. That is to say, all of incident light rays are inevitably subjected to the separating action of the polarizing filter 1. As shown in FIG. 2(a), each one of the inclined filter layer sections 21 of the first group is connected crosswise with adjacent inclined filter layer sections 22 of the second group at two positions slightly inward of the plane of incidence 1S and the plane of transmission 1R of the polarizing filter 1, respectively. Since the inclined filter layer sections 21 of the first group are connected with the inclined filter layer sections 22 of the second group at crossing points CR which are located internally of the polarizing filter 1, there is no possibility of a gap being opened in the polarization separating filter layer 2 in the directions of X- and Y-axes. Thus, all of incident light rays are inevitably and unmistakably subjected to the separating action of the polarizing filter 1.

Referring to FIG. 2(b), of an incident light ray L1 which is shed on an inclined filter layer section 22 at a position clear of a crossing point CR, p-polarization is passed forward as a transmitted component L1P while s-polarization is reflected off as a reflected component L1S by the separating action of the inclined filter layer 22. The reflected component L1S is reflected again by an ensuing inclined filter layer section 21 into a direction inverse to the transmitted component L1P. On the other hand, a light ray incident on a crossing point CR is separated by either an inclined filter layer section 21 or 22, which transmits p-polarization as a transmitted component L2P and reflects s-polarization as a reflected component L2S.

In this instance, the crossing points CR are formed inward of front and rear surfaces of the transparent member 3. Therefore, even if the positions of the crossing points CR are deviated to a certain degree, incident light is invariably transmitted through the polarization separating coating 2 as long as the crossing points CR are located inward of the front and rear surfaces of the transparent member 3. Further, in the case of the polarizing filter 1 which is exemplified in FIGS. 1 and 2, the crossing points CR are located inwardly in the vicinity of front and rear surfaces of the transparent member 3, and the polarization separating filter layer 2 is formed continuously in an approximately zigzag shape. However, the crossing points CR may be formed in other positions within the thickness of the transparent member 3, because all of incident light are inevitably transmitted through the polarization separating coating 2 as long as the crossing points CR are located inward of the front and rear surfaces of the transparent member 3.

As explained above, the polarizing filter 1 according to the present invention is provided with the polarization separating filter layer 2 of an approximately zigzag shape, which is formed by successively connecting a plural number of inclined filter layer sections 21 of the first group crosswise and alternately with a plural number of inclined filter layer sections 22 of the second group at positions inward of the plane of incidence 1S and the plane of transmission 1R, ensuring that the polarization separating filter layer 2 is formed continuously in a gapless state. If a gap exists in the filter layer 2, the function of the polarizing filter is detrimentally impaired by light leakage through the gap.

Described in Example 1 below is a method for fabricating the polarizing filter 1 of the above-described embodiment of the invention.

EXAMPLE 1

Figure 3:
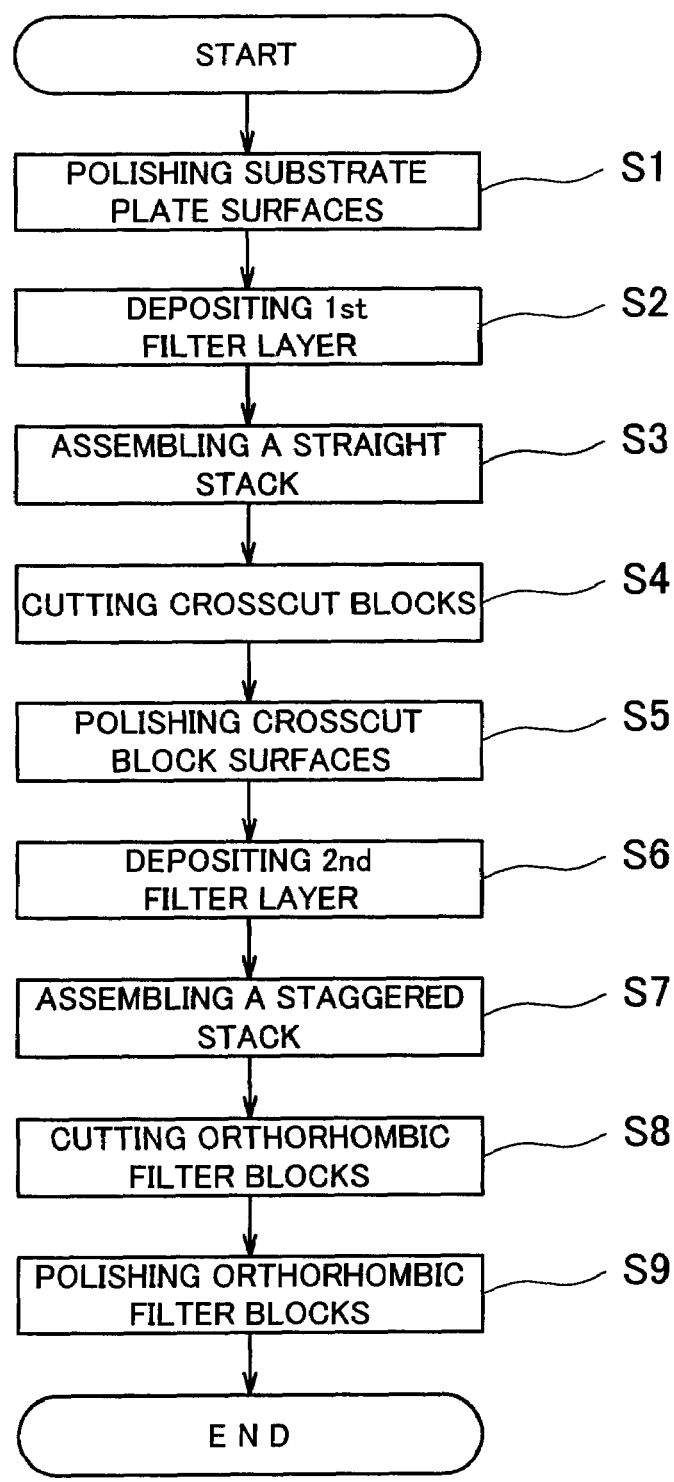
FIG. 3 is a flow chart of a process for fabricating the polarizing filter.

Shown in FIG. 3 is a flow chart of a process for fabricating the polarizing filter 1 of the above-described embodiment of the invention. As explained in the description of the above embodiment, the polarizing filter 1 is provided with a polarization separating filter layer 2 of an approximately zigzag shape, which is formed by connecting inclined filter layer sections 21 of the first group alternately and crosswise with inclined filter layer sections 22 of the second group. That is to say, the polarizing filter 1 cannot be fabricated simply by bonding in series a plural number of ordinary beam splitters (i.e., beam splitters having a polarization separating filter layer at an angle of 45 degrees within a transparent member of a cubic or rectangular parallelepiped shape) into a row by the use of an adhesive. The polarizing filter 1 of the above embodiment is manufactured by a method as described below.

Figure 4:
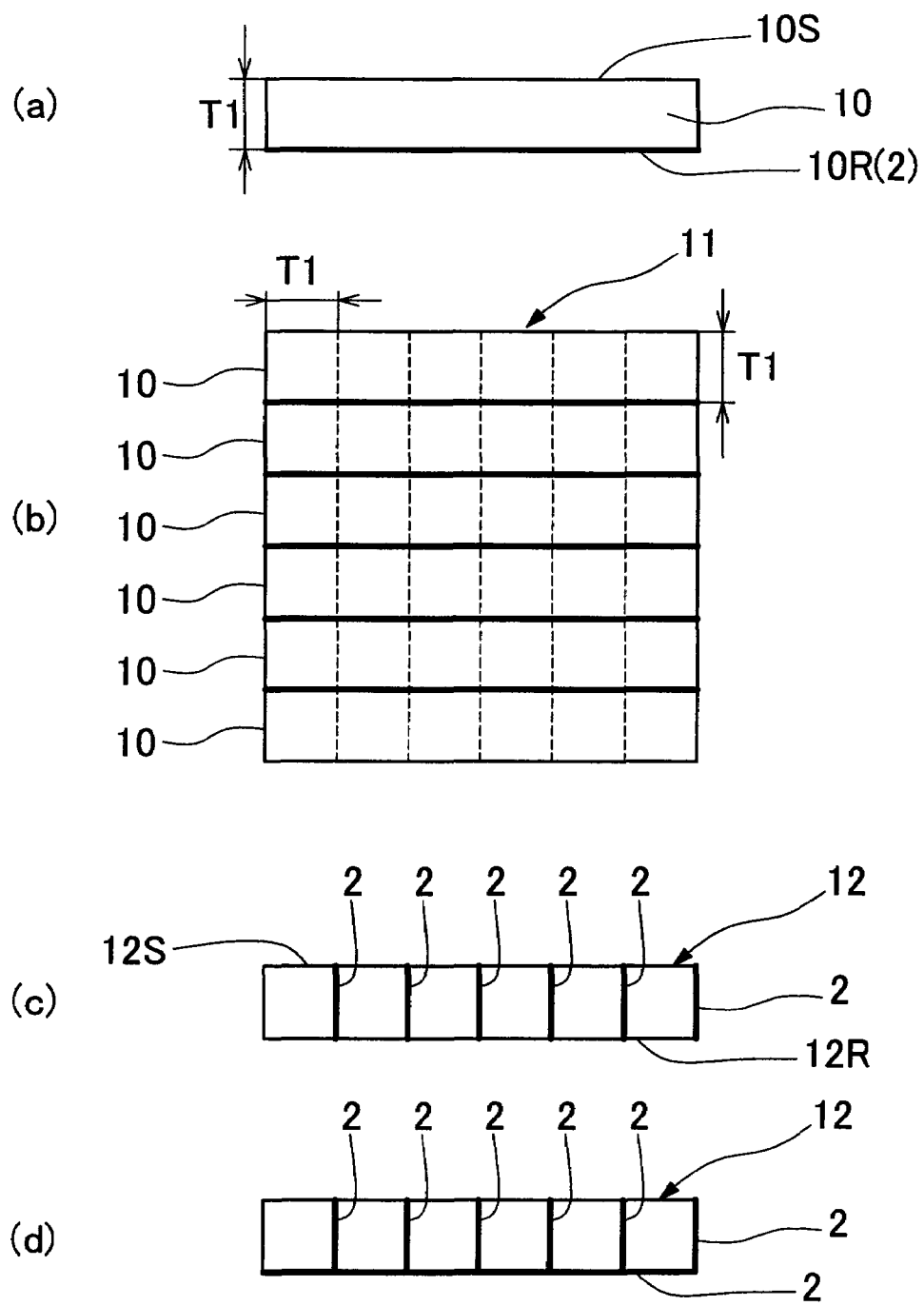
FIG. 4 is a schematic illustration explanatory of steps of producing crosscut blocks starting from planar transparent substrate plates.

As shown in FIG. 4(a), in the first place (Step S1), preparation is made for a number of transparent planar substrate plates 10 (having a thickness T1), polishing front and rear surfaces of each substrate plate 10 to a high degree of accuracy. Then, the polarization separating filter layer 2 is formed on a front or rear surface of each substrate plate 10 (Step S2). The polarization separating filter layer 2 is formed on a rear surface 10R in the particular example shown. The polarization separating filter layer 2 is a dielectric multi-layer coating which can be deposited by various methods such as vacuum deposition, ion plating, ion assist sputtering and other vapor deposition processes, alternately depositing a low refractivity layer and a high refractivity layer up to a predetermined number of layers while controlling the deposition material and time to impart aimed optical properties to the polarization separating layer 2.

In the next place, as shown in FIG. 4(b), a plural number of planar transparent substrate plates 10, each bearing a polarization separating filter layer 2 on a rear surface 10R but no filter layer on a front surface 10S, are stacked one on another in vertically aligned positions to form a straight stack 11, bonding a filter layer-bearing rear surface of a transparent substrate plate 10 with a blank front surface of another substrate plate 10 (Step S3). By way of example, a straight stack 11 consisting of six substrate plates is shown in the drawing. Then, as indicated by broken lines in FIG. 4(b), the straight stack 11 is cut at uniform intervals perpendicularly to the polarization separating filter layers 2 to prepare crosscut blocks 12 (Step S4). In this instance, the crosscut blocks 12 are cut in a width which is equivalent with the thickness T1 of the transparent substrate plates 10.

Shown in FIG. 4(c) is one of crosscut blocks 12 which are produced by the straight stack 11 along parallel cut lines perpendicular to the polarization separating filter layers 2. Each crosscut block 12 is in the shape of a planar plate having the polarization separating filter layers 2 at uniform intervals along its length. Cut surfaces 12S and 12R on the front and rear sides of the crosscut block 12 are not guaranteed in accuracy, that is to say, it is necessary to polish the front and rear surfaces 12S and 12R of the crosscut blocks 12 to put them in highly accurate surface conditions (Step S5). Thereafter, a polarization separating filter layer 2 is formed on the front surface 12S or on the rear surface 12R of each one of the crosscut blocks 12 (Step S6), on the rear surface 12R in the case of the particular example shown in the drawing. This polarization separating filter layer 2 is of the same nature and deposited by the same method as the polarization separating filter layer 2 which was formed on the transparent substrate plate 10 in Step S2.

Figure 5:
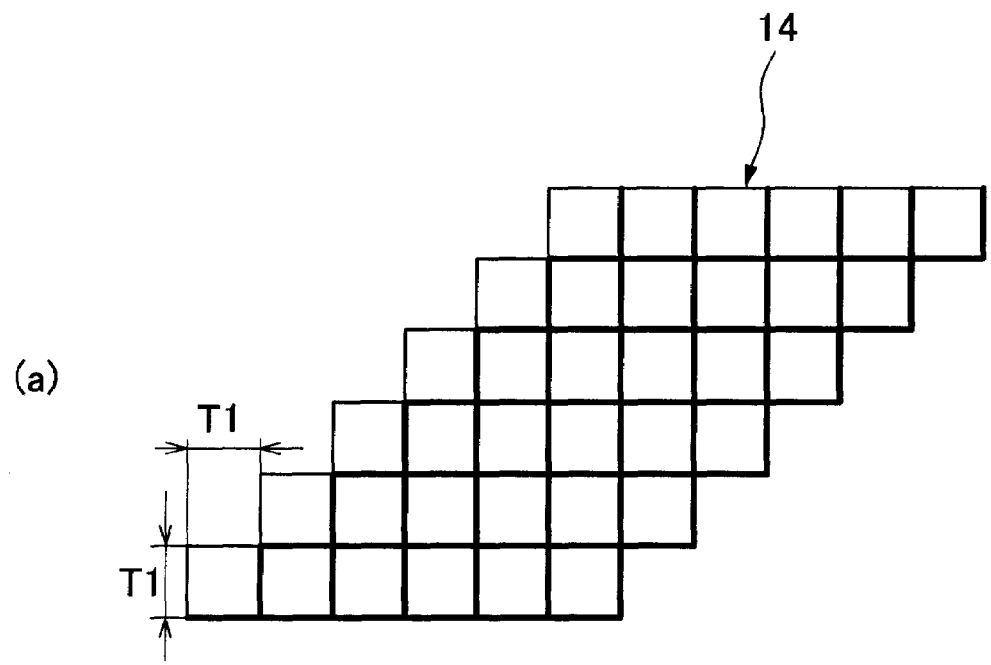
FIG. 5 is a schematic illustration explanatory of a staircase-like staggered stack of crosscut blocks and a method of cutting the staggered stack.
Figure 5:
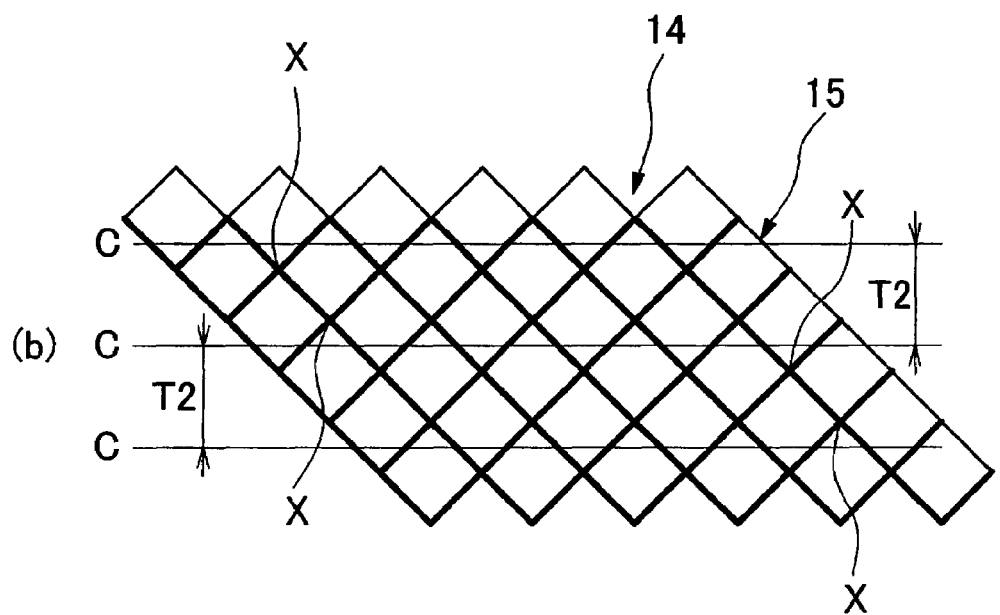

Now, as shown in FIG. 5(a), the crosscut blocks 12 are stacked and bonded together to form a staggered stack 14 in which the respective crosscut blocks 12 are stacked successively in staggered positions in the fashion of a staircase (Step S7). The staggered stack 14 is formed by bonding a rear surface 12R of a crosscut block 12, bearing the polarization separating filter layer 2, to a blank front surface 12S of another crosscut block 12, in a staggered position which is shifted by a distance corresponding to the thickness T1. By so doing, the crosscut blocks 12 are ultimately assembled into the form of a staggered stack as shown in 5(a).

Figure 6:
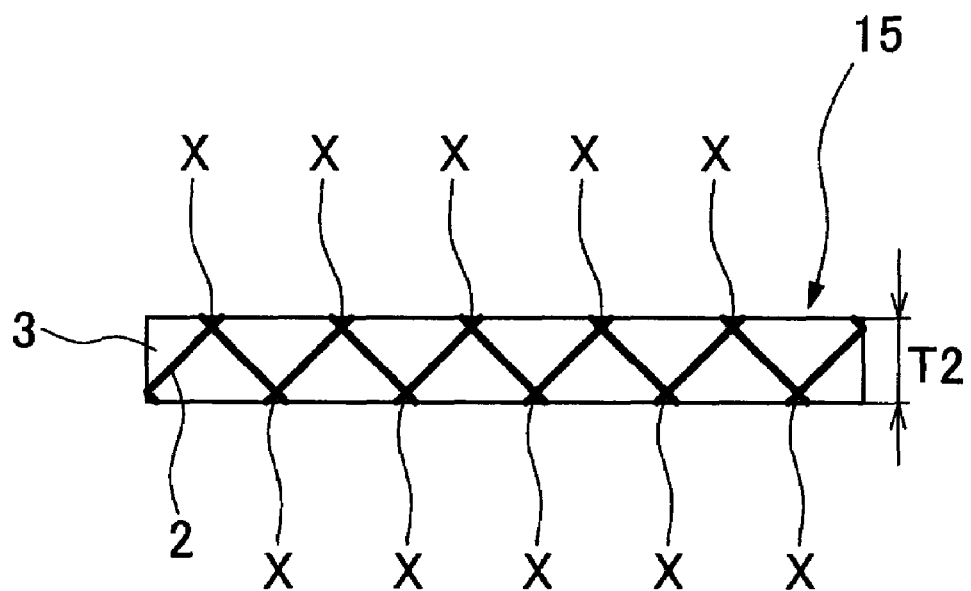
FIG. 6 is a schematic side view of an orthorhombic filter block.

The staggered stack 14 is then cut along inclined cutting lines which are at the same angle of inclination as the inclination angle of the staggered stack 14, to produce a plural number of orthorhombic filter blocks 15 as shown in FIG. 6 (Step S8). The staggered stack 14 is cut along cutting lines at an inclined angle as explained below. As seen in FIG. 5(a), positions of the respective crosscut blocks 12 in the staggered stack 14 are staggered from a lower one by a distance corresponding to their thickness T1, in the fashion of a staircase. The inclination angle of the staircase-like staggered stack 14 is 45 degrees, and the staggered stack 14 is cut along cutting lines which are inclined to the same angle as the staggered stack 14, that is to say, cut along cutting lines which are at the angle of 45 degrees with the base line of the stack 14. For cutting at the angle of 45 degrees, the staggered stack 14 is fixedly set on a horizontal surface and cut along cutting lines at the angle of 45 degrees with the horizontal surface, or alternatively the staggered stack 14 is set on an inclined surface at the angle of 45 degrees with a horizontal surface and cut along cutting lines parallel with the horizontal surface. In FIG. 5(b), the staggered stack 14 is inclined 45 degrees relative to a horizontal surface and cut along cutting lines C parallel with the horizontal surface.

Shown in FIG. 5(b) is a staircase-like staggered stack 14 which is cut along uniformly spaced cutting lines C which are spaced apart by a distance T2. Orthorhombic filter blocks 15 which are obtained by cutting the staggered stack 14 at the intervals T2 are akin to the shape of the polarizing filter 1 of the ultimate product. As explained in the foregoing embodiment, the crossing points CR of the inclined filter layer sections 21 of the first group with the inclined filter layer sections 22 of the second group are located inward of the front and rear surfaces of the polarizing filter 1. In the case of the orthorhombic filter blocks 15 shown in FIG. 5(b), crossing points CR are formed at the intersecting points X of polarization separating layers 2. Each one of the orthorhombic filter blocks 15 has a thickness T2 in a direction perpendicular to the ascent angle of the staircase-like staggered stack 14. Therefore, the staggered stack 14 is cut in such a way that the crossing points CR are located within the thickness T2 of each orthorhombic filter block 15. In the above-described embodiment, a polarization separating filter layer 2 is formed in an approximately zigzag shape with the crossing points CR located inwardly in the proximity of the front and rear surfaces of a transparent member 3. Similarly, orthorhombic filter blocks 15 are cut in such a way that crossing points CR are located inwardly in the proximity of cut surfaces.

If necessary, a further reduction in thickness of the orthorhombic filter block 15 can be made by varying the spacing between cutting lines C. Namely, as long as the crossing points CR are located inward of orthorhombic filter blocks 15, the staggered stack 14 is not necessarily required to be cut along uniformly spaced cutting lines C as described above. That is to say, when the staggered stack 14 is cut along uniformly spaced cutting lines C as shown in FIG. 5(b), each orthorhombic filter block 15 still has an extra margin in thickness as compared with the polarizing filter 1 of the ultimate product. Therefore, the cutting intervals which determine the thickness of the orthorhombic blocks 15 can be set at a value smaller than T2. A reduction in thickness will make the shape of orthorhombic filter blocks 15 more akin to that of the polarizing filter 1 of the ultimate product. In case the staggered stack 14 is cut at intervals smaller than T2, offcuts (wasteful cut portions which do not satisfy the above-mentioned conditions on the crossing points CR) come out in addition to orthorhombic filter blocks 15, semi-finished units for the polarizing filter 1.

In order to have the crossing points CR inward of cut surfaces of the orthorhombic filter blocks 15, the cutting interval T2 for the staggered stack 14 should satisfy the conditions of $T2 > T1 \times \sin 45°$, namely, the conditions of $T2 > T1/\sqrt{2}$. The thickness-wise interval between crossing points downwardly in the vicinity of a cut surface and crossing points CR upwardly in the vicinity of a cut surface is $T1/\sqrt{2}$. Thus, in order to have the crossing points CR located inward of cut surfaces, the orthorhombic filter blocks 15 must have a thickness T2 which satisfies a conditional equation $T2 = T1/\sqrt{2}$.

Then, cut surfaces on the opposite sides of each orthorhombic filter block 15 are ground to impart thereto a high degree of surface accuracy (Step 9). By this surface polishing operation, each one of the orthorhombic filter blocks is finished to serve as the polarizing filter 1.

As described above, the polarizing filter 1 of the above-described embodiment can be fabricated by adoption of the method of this Example 1.

EXAMPLE 2

Figure 7:
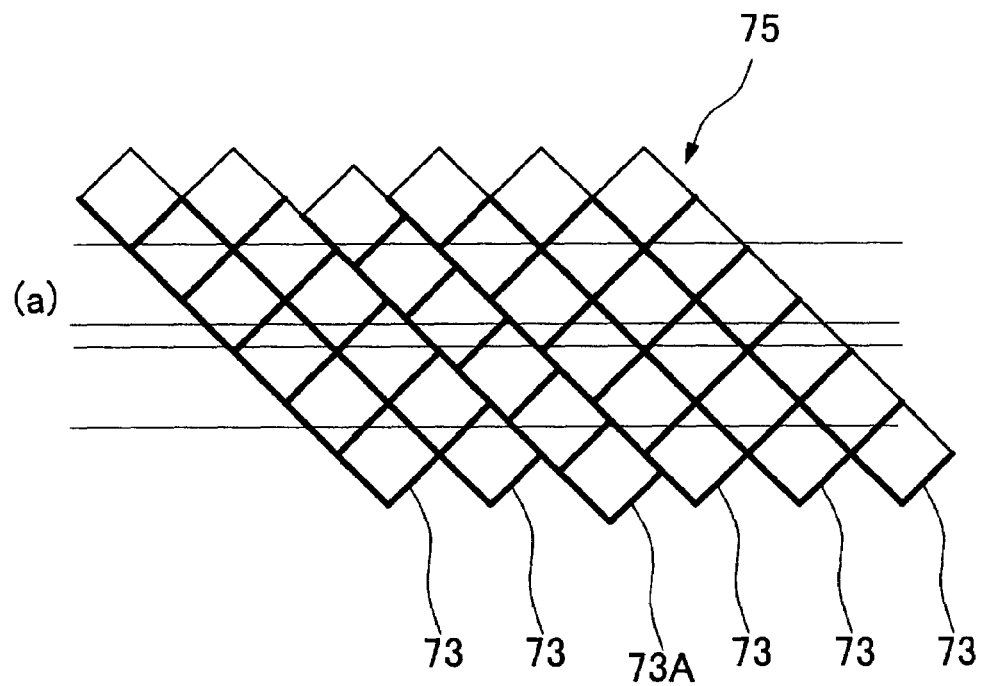
FIGS. 7(a) and 7(b) are a schematic illustration explanatory of a method of cutting a staircase-like staggered stack in a second embodiment of the invention, and a side view of a polarizing filter to be produced.
Figure 7:
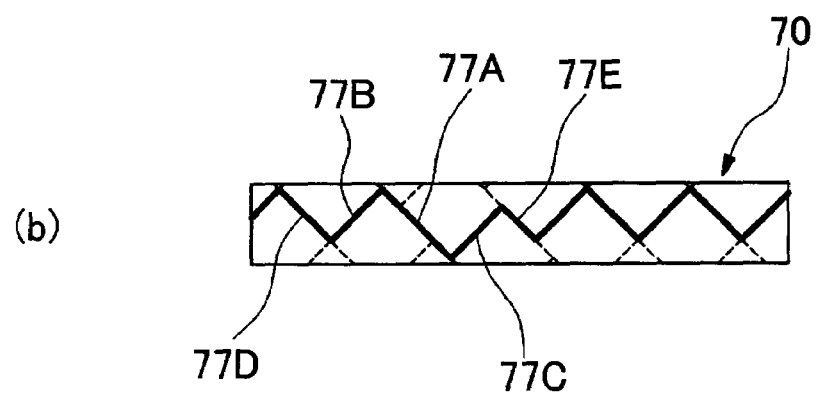

In the staircase-like staggered stack in Example 1 above, the position of each crosscut block is shifted from an underlying block by the same distance (T1). However, it is not an imperative requisite to shift the block positions strictly by the same distance in forming the staggered stack. In other words, the objective of the present invention can be achieved even if there are some deviations in shift positions of stacked blocks as exemplified in FIG. 7. Shown in FIG. 7(a) is a staggered stack 75 of another embodiment, which is formed by stacking crosscut blocks 73 in a staircase-like shape, each with a shift T1 (thickness of the crosscut blocks 73) from an underlying block 73, except a crosscut block 73a the position of which is not shifted uniformly by the same distance T1.

Shown in FIG. 7(b) is a polarizing filter 70, an ultimate product in this embodiment, which is different in construction from the polarizing filter 1 in the above-described first embodiment. Namely, in the above-described first embodiment, the crossing points of inclined filter layer sections, which are connected in an approximately zigzag shape, are located uniformly in specified positions in a thickness-wise direction of the filter 1. However, in the case of the polarizing filter 70 of the present embodiment, crossing points are not located in uniform positions. Nevertheless, the inclined filter layer sections of the polarization separating filter layer are connected continuously in a gapless state at the respective crossing points.

More specifically, the polarizing filter 70 is provided with a polarization separating filter layer which is composed of a plural number of inclined filter layer sections of a first group and a plural number of symmetrically inclined filter layer sections of a second group which are connected crosswise with preceding and succeeding filter layer sections of the first group at non-uniform unspecified positions in a thickness-wise direction, inward of a plane of incidence and a plane of transmission of the polarizing filter 70. In this instance, by part of the inclined filter layer sections of the first and second groups, the polarization separating filter layer is formed in an approximately zigzag form which is partly modified as compared with the shape of the filter layer in the above-described first embodiment. In FIG. 7(b), a filter layer which is formed in an approximately zigzag shape by part of the inclined filter layer sections of the first and second groups is indicated by a solid line and other portions which do not contribute to the zigzag shape are indicated by broken line.

As seen in the drawing, those portions of the first and second inclined filter layer sections which are indicated in solid line are connected continuously in an approximately zigzag shape. That is to say, a solid line portion of a first group inclined filter layer section (e.g., a solid line portion 77A) is connected crosswise with preceding and succeeding second group inclined filter layer sections (e.g., second group inclined filter layer sections 77B and 77C) which are in turn connected crosswise with solid line portions of adjacent first group inclined filter layer sections (e.g., 77D and 77E), respectively. In this manner, the first group inclined filter layer sections are connected continuously and crosswise with the second group inclined filter layer sections.

Namely, in the polarizing filter 1 of the above-described first embodiment, the first group inclined filter layer sections are crossed with the second group inclined filter layer sections inwardly in the vicinity of the plane of incidence and the plane of transmission, at a specific depth in a thickness-wise direction of the filter 1, presenting an approximately zigzag form which is relatively akin to a true zigzag form. On the other hand, in the case of the polarizing filter 70 of the present embodiment, crossing points are located at different depths and not located at a specified depth, and the connected filter layer sections are in an approximately zigzag shape which however is not akin to a true zigzag shape. Although remote from a true zigzag form, a continuous and gap-free filter layer can be formed inward of the plane of incidence and the plane of transmission of the polarizing filter 70. That is to say, the objective of the present invention can be achieved even if block positions are deviated to some extent at the time of assembling a staggered stack.

Focusing on the way of crossing of both solid and broken lines, it is observed that a plural number of first and second group inclined filter layer sections, which are exposed on the plane of incidence and on the plane of transmission at opposite ends, are connected with an inclined filter layer section of the other group in a cross shape or in a T-shape at least at two internal points of the polarizing filter. Those inclined filter layer sections which are exposed on the plane of incidence or on the plane of transmission at one end alone are connected with an inclined filter layer section of the other group in a T-shape, and those inclined filter layer sections which are not exposed on the plane of incidence and on the plane of transmission at neither end are connected with an inclined filter layer section of the other group in a T-shape at both ends.

With the above-described construction, a gapless and uninterrupted polarization separating filter layer is formed continuously internally of the polarizing filter 70 of the present embodiment, preclude the problem of light leakage as discussed hereinbefore. In this case, the staircase-like staggered stack 70 is cut at intervals T2 which satisfies the conditions of $T2>T1/\sqrt{2}$ where T1 is the thickness of crosscut blocks. By so doing, the polarizing filter 70 which is obtained as an ultimate product is free from the problem of light leakage despite positional deviations occurring to part of crosscut blocks when forming a staggered stack.

What is claimed is:

1. A polarizing filter of planar transparent substrate plates with a polarization separating filter layer to transmit or reflect incident light according to direction of polarization, said polarizing filter having a plane of incidence and a plane of transmission in the direction of two orthogonal X- and Y-axes and a thickness in the direction of Z-axis orthogonal to said X- and Y-axes, characterized in that said polarizing filter comprises:

a polarization separating filter layer comprising a first group of inclined filter layer sections each having a plane in the direction of said Z- and Y-axes inclined in the direction of said X-axis through a predetermined angle, alternately with a second group of inclined filter layer sections each having a plane in the direction of said Z- and Y-axes inclined through the same angle as but in a symmetrically inverse direction relative to said inclined filter layer sections of the first group;

the inclined filter layer sections of the first group being connected crosswise with said inclined filter layer sections of the second group in a cross shape or in a T-shape at positions inward of said plane of incidence and the plane of transmission of said polarizing filter; and each one of said inclined filter layer sections of the first and second groups, which is exposed on said plane of incidence and said plane of transmission of said polarizing filter at opposite ends, being connected crosswise with an adjacent inclined filter layer section of the other group in a cross shape or in a T-shape at least at two positions; each one of said inclined filter layer sections of the first and second groups, which is exposed on said plane of incidence or on said plane of transmission of said polarizing filter at one end alone, being connected crosswise with an inclined filter layer section of the other group in a T-shape at the other end; and each one of said inclined filter layer sections of the first and second groups, which is not exposed on said plane of incidence and said plane of transmission of said polarizing filter at any end, being connected crosswise with inclined filter layer sections of the other group in a T-shape at opposite ends.

2. A polarizing filter as defined in claim 1, wherein said inclined filter layer sections of the first and second groups are successively connected in a substantially zigzag shape.

3. A method for fabricating a polarizing filter of planar transparent substrate plates with a polarization separating filter layer to transmit or reflect incident light according to direction of polarization, said method comprising the steps of:

polishing surfaces at opposite sides of said planar transparent substrate plates;

forming a polarization separating filter layer on one of polished surfaces on front and rear sides of each transparent substrate plate;

forming a straight stack of said transparent substrate plates by successively stacking and bonding said substrate plates one on another in vertical alignment with each other, joining a filter layer-bearing side of a substrate plate to a blank side of another substrate plate;

cutting with a uniform distance said straight stack crosswise of said polarization separating filter layers formed on said substrate plates to produce crosscut blocks;

polishing cut surfaces of said crosscut blocks;

forming a polarization separating filter layer on one of polished surfaces on front and rear sides of said crosscut blocks;

forming a staggered stack of said crosscut blocks by successively stacking and bonding said crosscut blocks in staggered positions in the fashion of a staircase, joining a filter layer-bearing side of a crosscut block with a blank side of another crosscut block;

cutting said staggered stack along cutting lines with said staggered inclination angle to produce orthorhombic filter blocks of uniform thickness; and polishing cut surfaces of said orthorhombic filter blocks to produce polarizing filter units;

said cutting lines in cutting said staggered stack being spaced apart from each other by a distance T2 satisfying an equation $T2 > T1/\sqrt{2}$ where T1 is thickness of said crosscut blocks.

4. A method for fabricating a polarizing filter as defined in claim 3, wherein, in forming said staggered stack in the shape of a staircase, positions of said crosscut blocks are successively shifted from an adjacent block by a distance equivalent to thickness of said crosscut blocks.

* * * * *